Sept. 25, 1951     C. F. BOWERSETT ET AL     2,568,712
UNDERWATER SIGNALING DEVICE
Filed Dec. 18, 1947     5 Sheets-Sheet 1
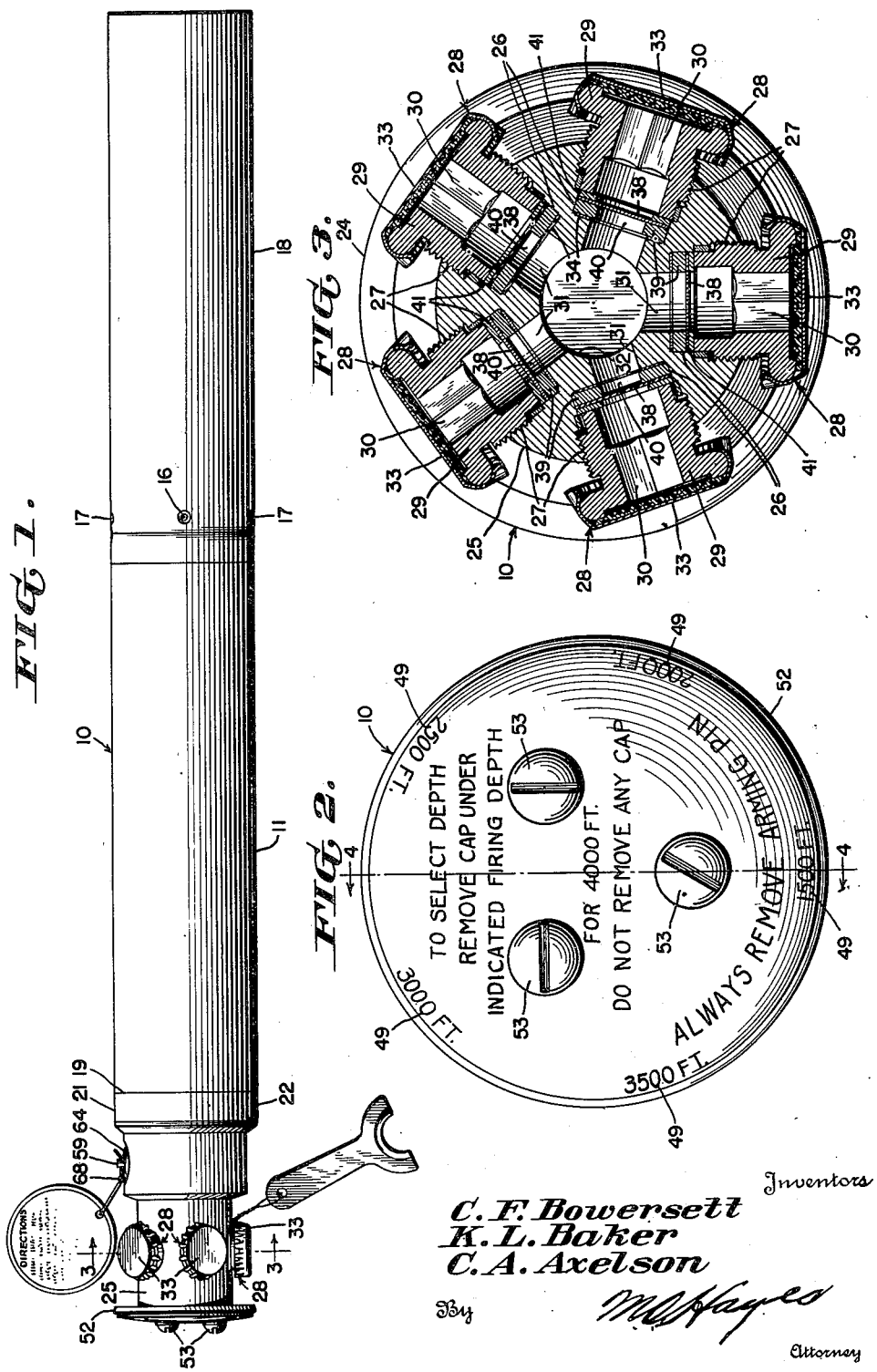
Inventors
C. F. Bowersett
K. L. Baker
C. A. Axelson

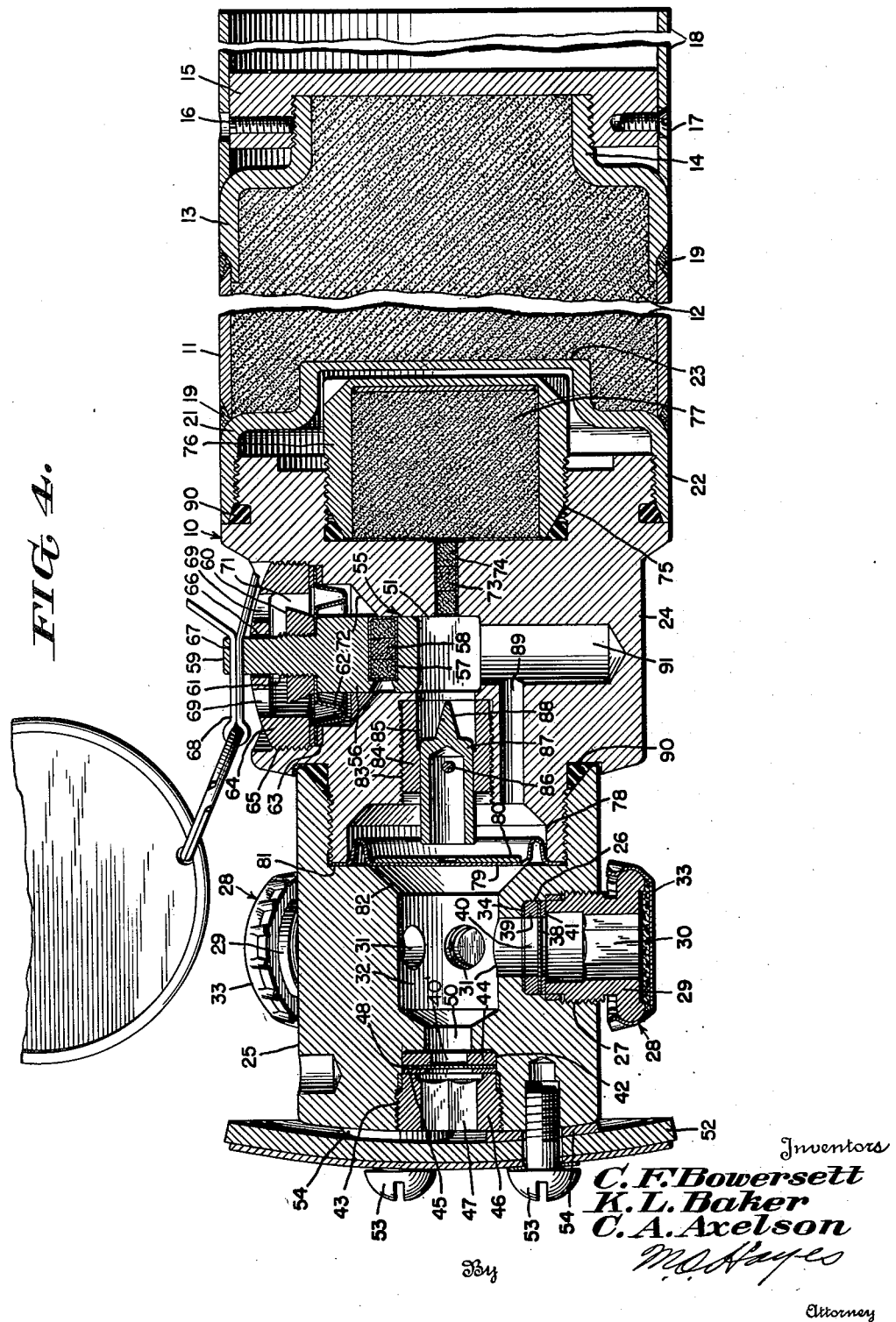

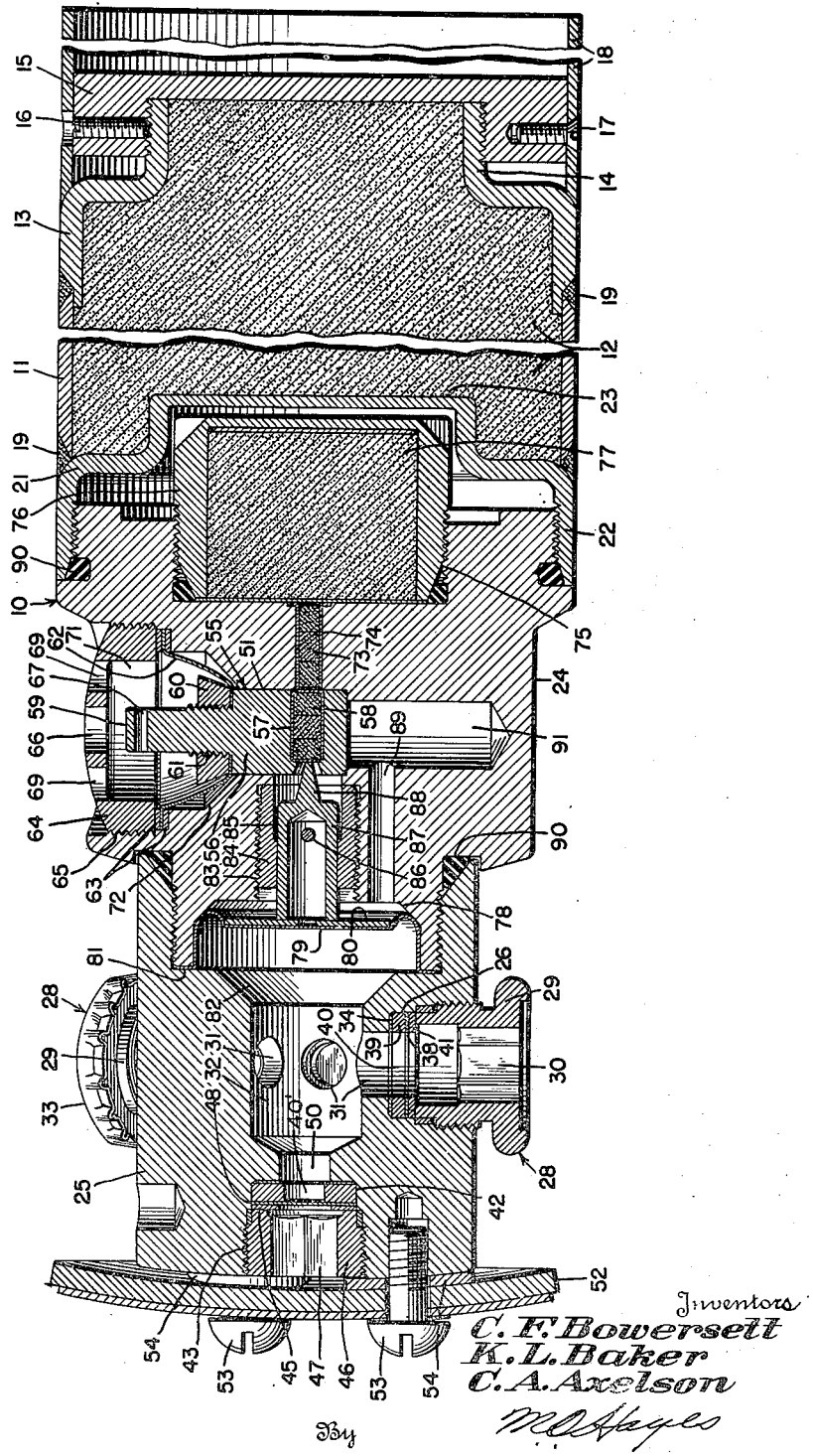

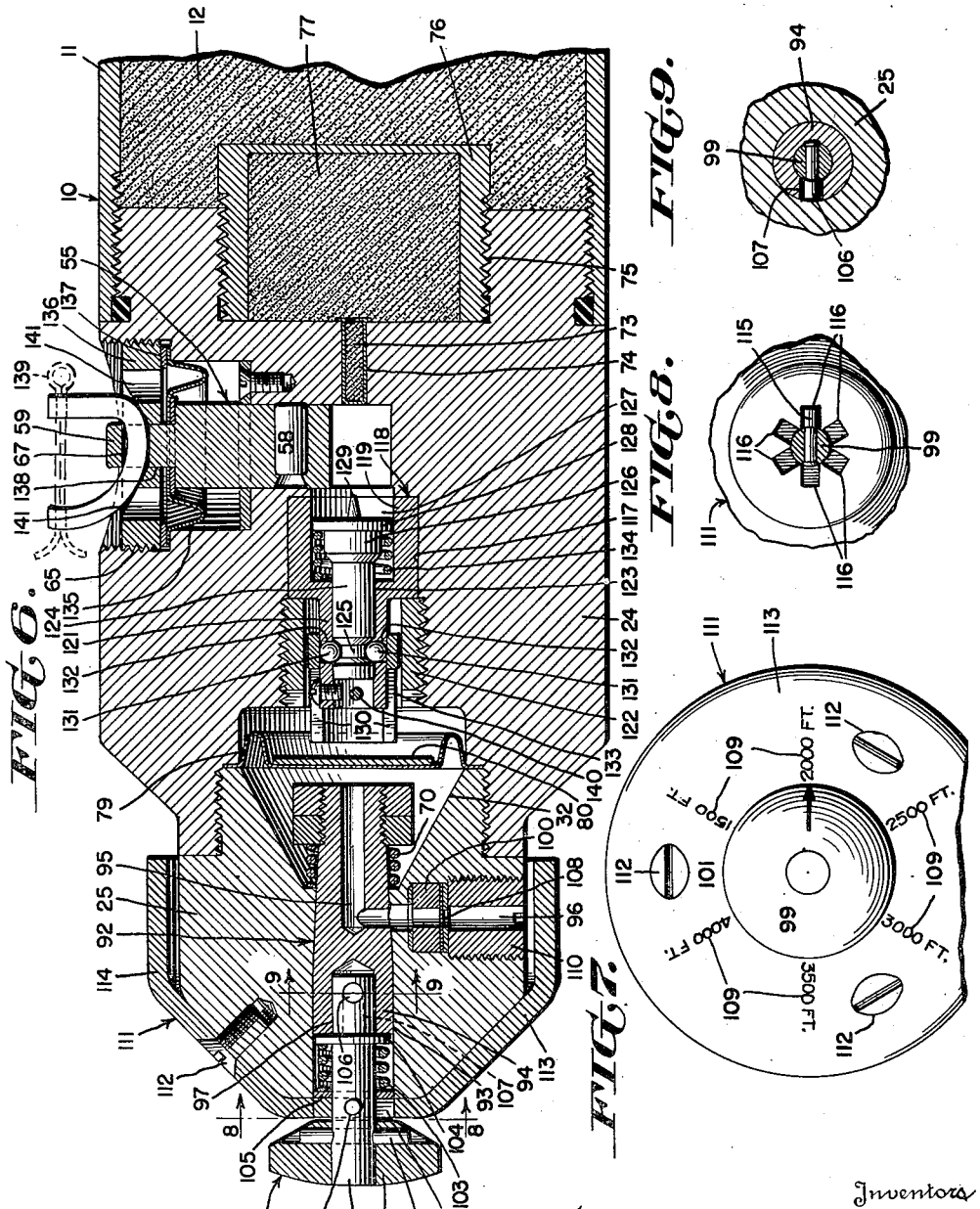

Sept. 25, 1951   C. F. BOWERSETT ET AL   2,568,712
UNDERWATER SIGNALING DEVICE
Filed Dec. 18, 1947   5 Sheets-Sheet 5
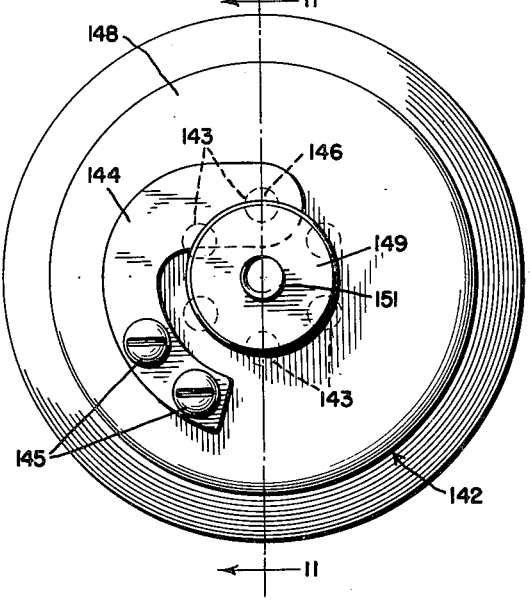
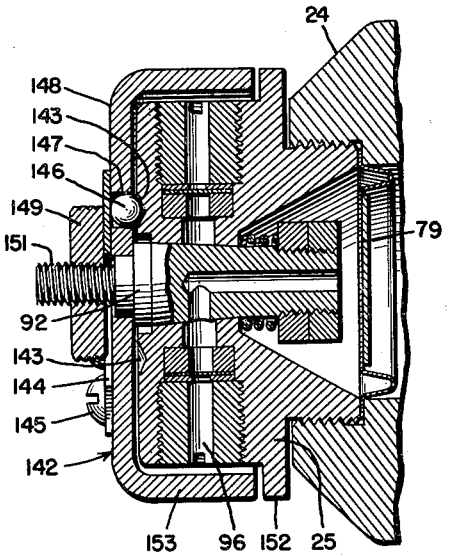
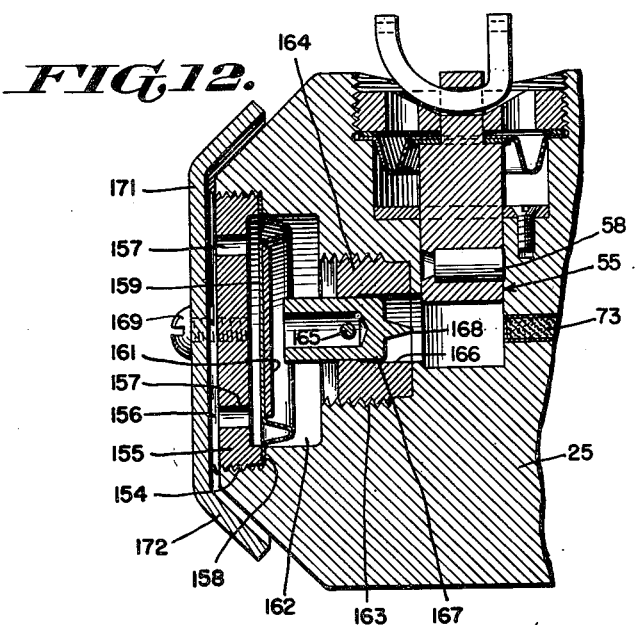
Inventors
C. F. Bowersett
K. L. Baker
C. A. Axelson
By
Attorney Patented Sept. 25, 1951

2,568,712

UNITED STATES PATENT OFFICE 2,568,712

UNDERWATER SIGNALING DEVICE

Charles F. Bowersett, Laurel, Md., and Kenneth L. Baker and Carl A. Axelson, Washington, D. C.

Application December 18, 1947, Serial No. 792,526

16 Claims. (Cl. 102—7)

(Granted under the act of March 3, 1883, as amended April 30, 1928; 370 O. G. 757)

This invention relates to a signaling device and more particularly to an underwater explosive signaling device adapted to be dropped from an aircraft or launched from a life raft into a body of water, in which means controlled by hydrostatic pressure is adapted to explode the signaling device when the device sinks to a predetermined depth within the body of water.

In accordance with the present invention, the underwater signaling device is constructed and arranged to be fired hydrostatically at a preselected depth when launched in a body of water as an indication of a party in distress whereby the sound of the explosion therefrom will travel along a sound channel of substantially predetermined depth within the body of water, whereby the sound signal may be recorded at one or more listening posts arranged either in the vicinity of the aforesaid explosion or located far remote therefrom, as the case may be. The sound signal actuates the listening devices associated with the receiving stations in successive order thereby to indicate the approximate location from whence the signal emanated whereby assistance may be sent to the party in distress with a minimum of delay after the initiation of the signal.

More specifically, the device of the present invention comprises means whereby the depth at which the device is adapted to explode is controlled by the rupture of a frangible seal or disc selected before the device is launched. For maximum range of signal transmission, the selected depth of the explosion of the device preferably will be the depth at which the velocity of sound within the body of water is at a minimum.

One of the objects of the present invention is the provision of a new and improved underwater explosive signaling device in which any one of a plurality of pressure responsive frangible devices may be selected for operation prior to launching the device into a body of water whereby the explosive charge within the device is fired by pressure actuated firing means when the selected frangible device has been ruptured as the signaling device sinks to a predetermined depth within the water.

Another object of the present invention is the provision of a new and improved underwater signaling device adapted to be launched in a body of water in which the arming thereof is controlled by hydrostatic pressure and firing thereof will occur when the device has reached a predetermined depth within the body of water.

Another object of the present invention is the provision of a new and improved underwater signaling device in which the firing pin therefor is forced to a firing position by a hydrostatically controlled device when the signaling device sinks to a predetermined depth within a body of water.

Another object of the present invention is the provision of a new and improved underwater signaling device including a plurality of rupturable pressure responsive discs in which means are provided for selecting any desired disc for rupture in response to pressure exerted thereon as the signaling device sinks to a predetermined depth within a body of water.

A further object of the invention is the provision of a new and improved underwater explosive signaling device adapted to be dropped from an aircraft or launched from a life raft and having means settable at will to different settings respectively corresponding to different seals to be selected for rupture thereby, whereby firing of the explosive charge therein will occur at a predetermined depth of submersion within a body of water in response to a hydrostatically actuated mechanism rendered effective by the rupture of the selected seal.

Still another object of the present invention is the provision of a new and improved hydrostatically actuated explosive signaling device having means settable at will to different settings respectively corresponding to the depth at which the device is to be fired and adapted to be locked in any selected setting.

Still other objects, advantages and improvements will be apparent from the following description, taken in connection with the accompanying drawings, of which:

Fig. 1 is an elevational view of the signaling device of the present invention;

Fig. 2 is an end view of the device of Fig. 1;

Fig. 3 is a sectional view taken on the line 3—3 of Fig. 1;

Fig. 4 is a longitudinal sectional view taken substantially on the line 4—4 of Fig. 2 and showing the device in a safe or unarmed condition;

Fig. 5 is a view similar to Fig. 4 and showing the firing means therefor in a firing condition;

Fig. 6 is a fragmentary longitudinal sectional view of an alternative form of the signaling device;

Fig. 7 is an end elevational view of the device of Fig. 6;

Fig. 8 is a detail sectional view taken on the line 8—8 of Fig. 6;

Fig. 9 is a detail sectional view taken on the line 9—9 of Fig. 6;

Fig. 10 is an end elevational view of another form of the signaling device;

Fig. 11 is a fragmentary sectional view taken on the line 11—11 of Fig. 10; and

Fig. 12 is a fragmentary sectional view of still another form of the device in which the depth at which the device is fired is controlled by a shear pin.

Referring now to the drawings for a more complete understanding of the invention wherein like reference characters designate like parts throughout the several views, and more particularly to Figs. 1 to 5 inclusive thereof there is shown thereon a preferred embodiment of the signaling device of the present invention, generally indicated by the reference character 10.

The device 10 comprises an elongated tube 11 having arranged therein an explosive charge 12. Secured to one end of the tube 11 as by welding the parts together is an annular member 13 having a portion 14 of reduced diameter integrally formed thereon adapted to have threaded engagement with a closure 15, the closure being maintained in locked engagement with the portion 14 by screws 16.

Detachably secured to the closure 15 in any suitable manner preferably as by screws 17 is a tubular stabilizer 18, Figs. 1, 4 and 5. It will be understood, however, that the stabilizer 18 is used in connection with the signaling device in cases where the altitude of the aircraft at the time the device is dropped is in excess of 200 feet. The stabilizer is adapted to maintain the device in a substantially vertical position during the free flight thereof toward a body of water.

As shown on Figs. 4 and 5 and welded to one end of the tube 11 as at 19 is a cup shaped member 21, comprising an annular flanged portion 22 and a centrally disposed depression 23, the flanged portion having threaded engagement with a casing 24. Secured to the casing 24 in any suitable manner, preferably as by threaded engagement therewith, is a head 25.

The head 25 has formed therein a plurality of circumferentially arranged recesses 26, each recess being threaded as at 27 for engagement with a depth selecting device generally indicated by the reference character 28, Fig. 3, and comprising a body portion 29 having a centrally disposed port 30 extending therethrough. Each port 30 is adapted to be in communication with a corresponding port 31 respectively formed in each of the heads 25 when a frangible seal arranged therebetween is ruptured, the ports 31 being in communication with a central chamber 32 formed in the head. Each of the ports 30 is sealed by a removable cap or the like 33 crimped about the outer end portion of the selecting device 28 as most clearly shown on Fig. 3. It will be understood, however, that any one of the caps 33 may be removed before the signaling device is launched within a body of water depending upon the depth of submergence at which the signaling device is adapted to be fired in response to hydrostatic pressure thereby rendering the associated selecting device effective to admit water pressure to the inner seal thereof. The ports 30 and 31 are each restricted by a frangible diaphragm or seal 38, composed of any material suitable for the purpose such, for example, as commercial sheet aluminum and adapted to be ruptured in response to a predetermined total amount of hydrostatic pressure exerted thereon as the signaling device sinks within a body of water, the depth of submergence at which rupture will occur corresponding to the pressure required to rupture a selected diaphragm. The diaphragms 38 are respectively arranged within the recesses 26 and each of the diaphragms is clamped between a relatively thick washer 39 and a relatively thin washer 41 by the selecting device 28, Figs. 3, 4, and 5, washer 39 being composed of any material suitable for the purpose such, for example, as brass, steel, aluminum or the like and washer 41 being composed of any suitable gasket material. Arranged in each recess 26 and in abutting engagement respectively with the washer 39 and a shoulder formed at the juncture of the recesses 26 and ports 31 is a sealing gasket 34. By this construction and arrangement a watertight connection is formed therebetween.

As shown on Figs. 3, 4, and 5 the washers 39 are provided with centrally disposed apertures 40 of different diameters. It will be understood by the aforesaid arrangement of the apertures and diaphragms 38 that the pressure required to rupture each diaphragm is proportional to the area of the diaphragm exposed to the corresponding opening in the washer and the diaphragms, therefore, are adapted to be ruptured selectively in response to different predetermined total amounts of hydrostatic pressure exerted thereon as the signaling device sinks within the body of water, the depth of submergence at which rupture will occur being controlled by the removal of a cap from the selecting device corresponding to the pressure required to rupture a selected diaphragm.

As shown on Figs. 4 and 5, a centrally disposed recess 42 is arranged in one end of the casing 25, the recess being threaded as at 43 for engagement with a plug 46. The plug 46 is similar to the device 28 except that the port 47 therein is not sealed by a removable cap 33, the purpose of which will be more clearly apparent as the description proceeds. The port 47 in plug 46 is adapted to be in communication with the chamber 32 by way of a duct 50 formed in the head 25. The ports 47 and 50 are normally sealed by a frangible diaphragm or disc 48 composed preferably of the same material as the diaphragms 38. The diaphragm 48 is arranged within the recess 42 and clamped between a pair of washers 44 and 45 by plug 46, the aperture 40' therein being of less diameter than the smallest of the apertures 40 within washers 39. By this arrangement the diaphragm 48 will rupture in response to hydrostatic pressure at the maximum depth at which the signaling device is adapted to function such, for example, as 4000 feet and the outer end of the port 47 in plug 46, therefore, is not sealed as is the case of the ports 30.

It should now be clearly apparent that the diaphragms 38 between washers 39 and 41 are adapted to rupture at different predetermined depths of submergence such, for example, as 1500, 2000, 2500, 3000, and 3500 feet respectively by reason of the size of the apertures 40 in the respective washers 39. Therefore, from the foregoing description, it will be understood that the diaphragms 38 and 48 will rupture selectively in response to a predetermined amount of hydrostatic pressure when the signaling device sinks to a selected depth within the body of water, such selection being controlled by the removal of one of the caps 37 before the device is launched. If, however, the signaling device is to function at a depth of 4000 feet none of the caps 37 are removed before the device is launched and the firing mechanism is rendered effective by the rupture of the diaphragm 48.

Each of the aforesaid ports is identified as to the depth at which the diaphragm will rupture by appropriate markings generally indicated by the reference character 49 inscribed on a baffle plate 52, Fig. 2. The baffle plate is secured to one end of the head 25 by screws 53 and maintained in spaced relation with respect to the outer surface thereof by spacers 54 disposed between the head 25 and the baffle plate, thus providing means whereby the pressure of the surrounding water may be admitted into the port 47 as the signaling device sinks within the water.

Arranged within a transverse bore 51 formed in the casing 24 for slideable movement therein is an arming shutter generally indicated by the reference character 55 and comprising a body 56 having a bore 57 extending therethrough in which is arranged a detonator 58, the body 56 being also provided with a stem 59 of reduced diameter integrally formed thereon. Clamped between a shoulder formed on the shutter and a nut 60 threaded on the stem as at 61 is a diaphragm 62 composed of material suitable for the purpose of sufficient rigidity to prevent premature movement thereof from an initial position until the pressure thereon has increased to a predetermined value, the outer portion of the diaphragm being also clamped between a pair of washers 63 by a plug 64 having threaded engagement with the walls defining a recess 65 arranged in the casing 24.

The plug 64 is provided with a centrally disposed opening 66 through which extends the stem 59, the stem terminating a predetermined distance beyond the plug and being provided with an opening 67 having arranged therein a removable safety pin 68 for preventing movement of the shutter 55 to an armed position during transit and storage. Surrounding the centrally disposed opening 66 in the plug 64 is a plurality of inlet ports 69 for admitting a sufficient amount of water pressure into a pressure chamber 71 formed between the end wall of the plug and the diaphragm 62 to cause expansion of the diaphragm in response thereto, such expansion of the diaphragm being adapted to move the shutter 55 to an armed position Fig. 5. It will be understood, however, that the shutter will not be moved to an armed position in the aforesaid manner until the signaling device sinks to a predetermined depth such, for example, as 750 feet.

As shown on Figs. 4 and 5 the casing 24 is provided with a well 72 in communication with the bore 51 thus permitting the diaphragm 62 to expand sufficiently to move the shutter to an armed position, such movement being controlled by a predetermined amount of hydrostatic pressure exerted on the diaphragm.

When the shutter has been moved to an armed position, Fig. 5, the detonator is brought into alignment with a lead-in charge 73 arranged within a centrally disposed bore 74 formed in the casing 24 and in communication with a recess 75 formed in one end thereof.

Threaded into the recess 75 and extending into the depression 23 in the cup shaped member 21 is a container 76 having arranged therein a booster charge 77 adapted to be fired by the lead-in charge 73 when the lead-in charge has been fired by the aforesaid detonator 58 and thus initiating firing of the explosive charge 12.

Arranged in a recess 78 formed in one end of the casing 24 is a firing diaphragm 79 composed of any material suitable for the purpose such, for example, as copper, the diaphragm being reinforced by a steel disc 80 secured thereto in any suitable manner preferably as by soldering the parts together. The diaphragm is clamped between the outer end portion of the casing 24 and a shoulder 81 formed within the enlarged portion 82 of the pressure chamber 32. In communication with the recess 78 is a bore 83 into which is threaded a nipple 84 having a centrally disposed opening 85 extending therethrough. Disposed within the opening 85 and restrained therein by a shear pin 86 is a firing pin 87, one end portion thereof normally terminating a predetermined distance from the diaphragm 79, the other end having a striker 88 integrally formed thereon, Figs. 4 and 5.

It will be understood, however, that the firing pin 87 is moved toward the detonator by the diaphragm 79 as the diaphragm is expanded in response to a predetermined amount of pressure exerted thereon, the pressure being admitted into the pressure chamber 32 by way of the selected port when the aforesaid diaphragm has been ruptured, such movement of the firing pin by the diaphragm 79 being sufficient to cause the shear pin 86 to be severed whereupon the firing pin is driven into firing engagement with the detonator 58. When this occurs the lead-in charge 73 is fired by the detonator which in turn fires the booster charge 77, whereupon the explosive charge 12 is fired by the booster charge.

A duct or port 89 is disposed within the casing 24 in communication with the recess 78, and in communication with a reduced portion 91 of the bore 51 and adapted to bleed the recess 78 of the air trapped therein, the air being forced into the portion 91 by way of duct 89 as the diaphragm 78 is expanded in response to the aforesaid pressure applied thereto, such bleeding action being adapted to permit the free movement of the diaphragm toward the firing pin.

As shown on Figs. 4 and 5 sealing gaskets 90 are disposed between the casing 24 and the head 25 and also between the casing 24 and the member 21. By this arrangement a water tight seal is provided between the aforesaid parts.

On Figs. 6 to 9 inclusive there is shown an alternative form of the device in which a tapered valve 92 is employed for selecting the depth at which the signaling device is adapted to be fired, the valve being rotatably supported within a bore 93 centrally formed within the head 25. The valve 92 is maintained within the bore 93 by spring 70, one end thereof being in engagement with a shoulder formed within the head 25 and the other end being in abutting engagement with one of a pair of nuts threaded on one end of the valve 92.

The selector valve 92 comprises a body 94 having an inlet port 95 arranged in one end thereof constructed and arranged to be brought in registration with any one of six ports 96 respectively formed in plugs 110 threaded into the head 25 and disposed circumferentially about the head 25, one of the plugs being shown on Fig. 6. The other end of the body 94 being provided with a centrally disposed socket 97, the purpose of which will appear as the description proceeds.

The valve 92 is rotated to a selected position by an actuating member 98 comprising a shaft 99, one end thereof being slideably disposed within the socket 97, the other end extending a predetermined distance beyond the head 25 and having a knob 101 secured thereto in any suitable manner preferably as by a pin 102. The aforesaid end of the shaft 99 is maintained within the socket 97 by a spring 103 having one end thereof in abutting engagement with a flange 104 formed on the shaft and the other end in abutting engagement with a washer 105 arranged about the shaft and disposed within the bore 93. Secured to the portion of the shaft 99 which is disposed within socket 97 is a pin 106, the pin extending into a slot 107 formed in the valve body 94 adjacent the socket 97 and thus providing means whereby rotative movement is transmitted to the valve through shaft 99 as the knob 101 thereon is rotated to the desired setting by an operator prior to the launching of the signaling device into a body of water.

From the foregoing description it will be understood that the valve 92 is adapted to be rotated into registration with any one of the aforesaid ports 96, the selection of the port depending upon the depth of submersion at which the signaling device is to be exploded.

While only one port 96 is shown on the device of Fig. 6, it will be understood, however, that the head 25 is provided with six equally spaced ports therein, each port being normally sealed by a frangible disc or diaphragm 108 disposed therein and constructed and arranged to be ruptured in response to a predetermined amount of hydrostatic pressure thereon controlled by the area of the corresponding port arranged within the washers 100 when the signaling device sinks to the selected depth within a body of water. Each port 96 is identified as the depth of submersion at which the diaphragm therein will rupture by appropriate marking 109 inscribed on a baffle plate 111 secured to the head 25 in any suitable manner preferably by screws 112, Figs. 6 and 7.

The baffle plate 111 comprises a conical portion 113 constructed and arranged to follow the contour of the conical portion of the head 25, the portion 113 of the baffle plate having formed thereon a shield 114, the shield surrounding the ports 96 and being disposed in spaced relation with respect thereto. By this arrangement the diaphragms within the ports 96 are protected from being accidentally ruptured and water is also permitted to enter the ports selectively when the signaling device is launched within a body of water.

The valve 92 is locked in the selected position by pin 115 secured to the shaft 99 thereof and extending into any one of a plurality of recesses 116 formed in the baffle plate 111, Figs. 6 and 7, the recesses being in alignment with the marking 109 on the baffle plate. When the valve is adapted to be moved to a selected setting, the knob 101 on the shaft 99 is grasped by the operator and an outward pull exerted thereon, whereupon the shaft 99 is moved outwardly within the socket 97 arranged in the valve 92 sufficient to permit the pin 115 to become disengaged from the instant recess 116. When this has been done the knob 101 is rotated to the desired setting and released, whereupon the spring 103 urges the actuating member inwardly and the pin 115 is moved into engagement with its respective recess thus locking the valve in the selected setting. It will be understood, however, that a driving connection is always maintained between the actuating member 98 and valve 92 by the aforesaid pin and slot connection 106 and 107.

Arranged within a well 117 formed in the casing 24 is a member 118, comprising a head 119 having integrally formed thereon a sleeve 121, the member being maintained within the well by a nut 122 threaded into the well 117 and having one end thereof in abutting engagement with the head 119. The member 118 is constructed and arranged to slideably and releasably support a firing pin generally indicated by the reference character 123.

The firing pin comprises a stem 124 arranged within the sleeve 121 and having a groove 125 formed in one end thereof, the other end being provided with an enlarged portion 126 disposed within a well 127 formed in the head 119. Arranged on the portion 126 of the firing pin 123 is a flange 128 having integrally formed thereon a striker 129 adapted to be moved into firing engagement with the detonator 58 arranged in the shutter 55 when the shutter has been moved to an armed position by the diaphragm 62 as heretofore described in connection with Fig. 5.

The firing pin 123 is releasably supported within the sleeve 121 by a pair of balls 131 respectively arranged within a pair of diametrically disposed openings 132 formed in the sleeve 121 and extending into the groove 125 in the stem 124, the balls being maintained within the groove by a sleeve 133 slideably disposed about the sleeve 121 and pinned thereto by a shear pin 140.

By the aforesaid arrangement it will be understood, that as the firing diaphragm 79 expands as heretofore described it is moved into engagement with the sleeve 133. When this occurs the pin 140 is sheared and the sleeve 133 is moved inwardly sufficiently to permit the balls 131 to be urged out of locking engagement with the locking groove 125 in the firing pin and into their respective slots 130 formed in the sleeve 133 thus releasing the firing pin 123 whereupon the striker 129 thereon is driven into firing engagement with the detonator 58 by a spring 134 disposed about the firing pin, one end of the spring being in engagement with the flange 128 on the firing pin and the other end thereof being in engagement with the end wall defining the well 127.

The firing diaphragm 79, Fig. 6, is controlled by hydrostatic pressure entering the pressure chamber 32 by way of port 96 in plug 119, corresponding port in washer 100, and inlet port in 95 in selector valve 92, such pressure being admitted when the frangible disc 108 has been ruptured in response to a predetermined amount of pressure.

In the device of Fig. 6 shutter 55 is controlled by a diaphragm 135 constructed and arranged to move the shutter to an armed position in response to a predetermined amount of hydrostatic pressure thereon.

The diaphragm 135 is clamped within the recess 65 by a plug 136, the plug having threaded engagement with the walls defining the recess 65. A suitable sealing gasket 137 is employed between the plug and diaphragm.

The plug 136 is provided with a centrally disposed opening 138 through which extends the stem 59 of the shutter, the stem terminating a predetermined distance beyond the plug and having a substantially U-shaped safety pin extending through the opening 67 therein. Accidental withdrawal of the safety pin is prevented by a cotter pin 139. The plug 136 is also provided with a plurality of inlet ports 141 for admission of water therethrough thereby to cause expansion of the diaphragm, such expansion being adapted to move the shutter 55 to an armed position.

From the foregoing description it will be understood, that when the firing pin 123 is released in the aforesaid manner the firing pin is urged toward the detonator 58 by the spring 134 whereupon the striker 129 thereon is driven into firing engagement with the detonator. When this occurs the lead-in charge 73 is fired by the detonator which in turn fires the booster charge 77, and thus the explosive charge 12 is fired.

In the alternative form of the device as shown on Figs. 10 and 11 the valve 92 is constructed and arranged to be rotated and locked in the selected position, the valve being secured to a baffle plate 142 and rotated to the selected position thereby.

Arranged on the head 25 of the device and disposed axially about the valve 92 are a plurality of equally spaced recesses 143, each recess being disposed in alignment with respect to an associated port 96, the purpose of which will be more clearly apparent as the description proceeds.

One end of a substantially U-shaped spring 144 is secured to the plate 142 as by a pair of screws 145, the other or free end thereof being in abutting engagement with a locking ball 146 disposed within an opening 147 formed in the end wall 148 of the plate 142 and urged into the recess 143, Fig. 11, by the free end of the spring 144 and thus the valve 92 is maintained in a selected position.

If desired, the valve 92 may be locked in the selected position by a nut 149 threaded on the valve stem 151 and in abutting engagement with the spring 144, the free end of the spring being maintained in abutting engagement with the ball 146 by the aforesaid nut and thus the ball is locked within the recess 143 and further rotation of the valve is prevented. It will be understood, however, that when the valve is adapted to be rotated to the selected position, the nut 149 is backed off the valve stem 151 a predetermined amount thereby to permit the spring to move out of engagement with the ball 146 and thus the ball will ride out of the various recesses 143 as the valve is rotated.

In the device of Figs. 10 and 11 equally spaced marking may be inscribed on the flange 152 formed on the head 25 opposite each port 96 to indicate the depth of submersion at which the diaphragm therein will rupture. The annular shield 153 formed on the plate 142 is provided with a suitable mark adapted to be brought into alignment with any selected marking on the flange 152 when the valve is rotated by the plate 142 to a selected position.

On Fig. 12 there is shown still another form of the device, in which the rupturable diaphragms are replaced by a shear pin and firing of the detonator within the arming shutter 55 is controlled by a hydrostatically operated device which is rendered effective as the pin is sheared in response to a predetermined pressure of the surrounding water applied to the hydrostatic device. In this form of the invention, the head 25 is provided with a centrally disposed well 154 having threaded therein a plug 155. The plug is provided with a transverse slot 156 in communication with a pair of inlet ports 157.

Secured between the end of the plug 155 and a shoulder 158 formed within the well 154 is a firing diaphragm 159 having a reinforcing disc 161 attached thereto in any suitable manner preferably as by soldering the parts together, the diaphragm being arranged within a reduced portion 162 of the well 154.

In communication with the reduced portion 162 of the well 154 is a bore 163 in which is threaded an annular member or support 164.

Restrained by a shear pin 165 arranged within the annular member 164 and disposed within a bore 166 therein is a firing pin 167, the firing pin being normally in spaced relation with respect to the disc 161 and having formed thereon a striker 168 adapted to be brought into firing engagement with the detonator 58 when the shear pin 165 has been severed in response to a predetermined amount of pressure applied thereto. Such pressure is applied to the shear pin after the disc 161 secured to the diaphragm 159 has been moved into engagement with one end of the firing pin 167 and the additional pressure caused by additional movement downwardly of the device within the water is sufficient to cause the pin to shear as the selected depth is reached. The hydrostatic pressure is admitted into the casing by way of slot 156 and openings 157. From the foregoing it will be apparent that for a shear pin composed of material suitable for the purpose such, for example, as phosphor bronze, the size and strength of the shear pin controlling the depth at which the device is fired.

Secured to the outer end portion of the head 25 as by screws 169, one of which is shown on Fig. 12, is a baffle plate 171, the inclined wall 172 thereof being in spaced relationship from the head 25 thereby to provide for the admission of water into the aforesaid slot and openings when the device has been launched.

It will be understood that the depth at which the device of Fig. 12 is adapted to be fired depends on the strength and durability of the shear pin 165. The shear pin may be constructed of such material and arranged as to shear at a preselected depth of submersion of the signaling device such, for example, 1500, 2000, 2500, 3000, 3500, or 4000 feet.

Briefly stated in summary, the present invention comprises the provision of a new and improved explosive signaling device in which means such as a shear pin or a plurality of pressure responsive discs rupturable at different depths of submersion within the water are employed, any one of which discs may be selected for rupture at a predetermined degree of hydrostatic pressured applied thereto prior to launching of the device within a body of water, such selection corresponding to the depth of submersion at which the device is to be fired, and in which arming means therefor is controlled by hydrostatic pressure and adapted to arm the device prior to rupture of the selected disc, and in which a normally locked firing pin is released and forced into firing engagement with a detonator by hydrostatically controlled means immediately following the rupture of the selected pressure responsive disc or the severance of the shear pin, as the case may be. The present invention also comprises means for preventing an inadvertent change in the setting of the depth selecting mechanism from a selected position thereof after a selection has been made.

While the invention has been described with reference to several embodiments thereof which give satisfactory results, it will be obvious to those skilled in the art to which the invention pertains, after understanding the invention, that various changes and modifications may be made without departing from the spirit and scope of the invention, and it is intended, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. A signaling device of the class described adapted to be launched in a body of water and comprising a casing, an explosive charge disposed within said casing, an arming member slideably disposed within the casing constructed and arranged to be moved from a safe position to an armed position, a pressure responsive diaphragm arranged within the casing for moving said arming member from said safe position to said armed position when the signaling device has reached a predetermined depth of submergence, a plurality of spaced sealed ports disposed about the casing, means for unsealing a selected one of said ports prior to said launching, a frangible disc arranged within said selected port for admitting a predetermined hydrostatic pressure from the surrounding water into the interior of the casing when said selected port has been unsealed and the disc has been ruptured in response to said hydrostatic pressure, and means including an initially rigid preformed pressure responsive diaphragm arranged within the casing and constructed and arranged to be suddenly deformed by the pressure within the casing for firing said explosive charge when the disc has been ruptured.

2. In a signaling device of the class described adapted to be launched in a body of water, a casing, an explosive charge disposed within said casing, an arming member slideably arranged within the casing and constructed and arranged to be moved from a safe position to an armed position when the signaling device sinks to a predetermined depth of submergence, a detonator disposed within said arming member, means responsive to hydrostatic pressure for moving said arming member to said armed position, a plurality of spaced ports disposed about the casing, a plurality of removable caps secured to said ports for respectively sealing the ports, each of said ports being selectable by removal of the associated cap therefrom, a frangible disc arranged within the selected port for admitting a predetermined hydrostatic pressure into the interior of the casing as the disc is ruptured in response to the pressure of the surrounding water corresponding to a predetermined depth of submergence of the device therein in excess of said first named depth of submergence, a normally locked firing pin releasably supported in the casing and constructed and arranged to be moved into firing engagement with said detonator when the firing pin is released, an initially rigid preformed pressure responsive diaphragm arranged within the casing and constructed and arranged to be suddenly deformed by the pressure within the casing for releasing and moving the firing pin into firing engagement with said detonator, and means fired by said detonator for firing said explosive charge.

3. A signaling device of the class described adapted to be launched in a body of water and comprising a casing, an arming member arranged within the casing and maintained in a safe position and adapted to be moved and locked in an armed position when the signaling device sinks to a predetermined depth of submergence a detonator disposed within said arming member, a preformed metallic diaphragm secured to said casing in sealed relation therewith and operatively connected to the arming member for initially maintaining the arming member in said safe position and for moving the arming member into said armed position when deformed in response to hydrostatic pressure applied thereto, said diaphragm having sufficient rigidity to lock the arming member in said armed position a plurality of frangible discs secured to the casing and adapted to be ruptured in response to different values of hydrostatic pressure respectively corresponding to different predetermined depths of submersion of the device, means including a valve rotatably supported within said casing for selecting for operation one of said discs thereby to admit said pressure into the interior of the casing as the selected disc is ruptured, and means including an initially rigid preformed pressure responsive device deformed by the pressure within the casing for firing said detonator when the signaling device sinks within the water to a depth sufficient to rupture the selected disc.

4. A signaling device of the class described adapted to be launched in a body of water and comprising a casing, a detonator disposed within said casing, a plurality of inlet ports arranged around the casing, a plurality of rupturable discs respectively secured within said ports adapted to be ruptured in response to different values of hydrostatic pressure respectively corresponding to different depths of submergence, means including a valve rotatably supported within the casing for selecting for operation one of said discs, means for locking said valve to the casing as one of said discs is selected for operation, a duct in said selecting means adapted to be brought in registration with the inlet port of the selected disc as the disc is selected thereby to admit hydrostatic pressure into the interior of the casing as the disc within the selected port is ruptured, a normally locked firing pin releasably supported within the casing for movement into firing engagement with said detonator when released and a preformed pressure responsive device secured within said casing in sealed relation therewith and constructed and arranged to be deformed suddenly by the pressure within the casing for releasing and moving the firing pin into firing engagement with the detonator when the signaling device sinks within the water to a depth sufficient to rupture the selected disc.

5. A signaling device of the class described adapted to be launched in a body of water and comprising a casing, an explosive charge arranged within said casing, a detonator disposed within the casing, a plurality of inlet ports arranged around the casing, a plurality of frangible discs respectively secured within said inlet ports and adapted to be ruptured in response to different values of hydrostatic pressure applied thereto, said values of pressure respectively corresponding to different depths of submersion of the device, a valve rotatably supported within the casing and settable at will to different settings for selecting for operation one of said discs means on the casing for respectively locking the valve in any one of said different settings, a duct in said valve adapted to be brought in registration with a selected inlet port when the valve is rotated to a selected setting for admitting said pressure into the interior of the casing as the selected disc is ruptured, a firing pin, means for releaseably supporting the firing pin within the casing, a preformed metallic diaphragm secured within the casing in sealed relation therewith and constructed and arranged to be deformed suddenly in response to said admitted pressure for releasing the firing pin when said releasing means is actuated by movement resulting from the deformation of the diaphragm, means for moving said firing pin into firing engagement with said detonator when the firing pin is released, and means fired by the detonator for firing said explosive charge.

6. A signaling device of the class described adapted to be launched in a body of water and comprising a casing, an explosive charge arranged within the casing, a detonator disposed within said casing for firing said explosive charge, a plurality of inlet ports disposed around the casing, a plurality of frangible discs respectively arranged within said ports and adapted to be ruptured in response to different values of hydrostatic pressure applied thereto, said values of pressure respectively corresponding to different depths of submersion of the device, a valve rotatably supported within the casing for selecting for operation one of said discs, a port in said valve adapted to be brought into registration with a selected inlet port for admitting hydrostatic pressure into the interior of the casing as the disc within said selected port is ruptured in response to the pressure of the surrounding water, a firing pin releasably supported within the casing and constructed and arranged to be moved into firing engagement with the detonator when the firing pin is released, means including a normally locked movable sleeve for releasably supporting said firing pin within the casing, a preformed pressure responsive diaphragm disposed within the casing and constructed and arranged to be deformed suddenly and sufficiently to cause unlocking and moving said sleeve to a release position, means for urging the firing pin into firing engagement with the detonator as the firing pin is released by said releasing means in response to movement resulting from the deformation of said diaphragm, and means fired by said detonator for firing said explosive charge.

7. In a signaling device of the class described adapted to be launched in a body of water, a casing having an explosive charge therein, an arming member arranged within the casing and maintained in a safe position and adapted to be moved and locked in an armed position when the signaling device sinks to a predetermined depth of submergence, a detonator disposed within said arming member, an initially rigid diaphragm secured to said casing in sealed relation therewith and operatively connected to the arming member for initially maintaining the arming member in said safe position and for moving the arming member into said armed position in response to hydrostatic pressure applied thereto, said diaphragm having sufficient rigidity when deformed to lock the arming member in said armed position, a plurality of inlet ports disposed around the casing, a plurality of frangible discs respectively arranged within said inlet ports and constructed and arranged to be ruptured in response to different values of hydrostatic pressure respectively applied thereto, said values of pressure respectively corresponding to different depths of submergence of the device, a valve rotatably supported within casing and settable at will to different settings for selecting for operation the disc within a selected port when the valve is rotated to a selected setting, a port in said valve adapted to be brought in registration with a selected inlet port when the valve has been rotated to a selected setting for admitting hydrostatic pressure into the interior of the casing as the disc within the selected port has been ruptured in response to the pressure of the surrounding water, means for locking the valve in said selected setting, a firing pin releasably supported within the casing and constructed and arranged to be moved into firing engagement with the detonator, means including a sleeve for releasably locking the firing pin within the casing and adapted to release the firing pin when moved to a released position, a shear pin for locking said releasing means in an initial locking position, a preformed pressure responsive diaphragm arranged within the casing and deformed sufficiently by said pressure within the casing to cause shearing of said pin and movement of said locking means sufficiently to said release position, a spring for urging the firing pin into said firing engagement with said detonator when the firing pin is released, and means fired by the detonator for firing said explosive charge.

8. A signaling device of the class described adapted to be launched in a body of water and comprising a casing, an explosive charge disposed within said casing, an arming member slideably arranged within the casing and constructed and arranged to be moved to an armed position when the signaling device sinks to a predetermined depth of submergence within the water, a detonator disposed within the arming member, means responsive to hydrostatic pressure for moving the arming member to said armed position, a plurality of inlet ports disposed around the casing, a plurality of frangible discs respectively arranged within said ports and adapted to be ruptured in response to different values of hydrostatic pressure applied thereto, said values of pressure respectively corresponding to different depths of submergence of the device, a valve rotatably supported within the casing and settable at will to different settings, means operatively connected to said valve for rotating the valve to a selected setting for selecting for operation the disc within a selected port, a port in said valve adapted to be brought into registration with the selected inlet port when the valve has been rotated to a selected setting thereby admitting hydrostatic pressure into the interior of the casing as the disc within the selected port is ruptured, means including a locking ball for locking the valve in said selected setting, a firing pin releasably locked within the casing in a safe position and constructed and arranged to be moved into firing engagement with the detonator when the firing pin is released, movable means including a pair of locking balls for releasably locking the firing pin in said safe position and adapted to be moved to a released position, a preformed pressure responsive diaphragm sealed to the casing and normally spaced from said locking means and constructed and arranged to be deformed suddenly by the pressure within the casing sufficiently to engage and move the locking means to the release position, means on the firing pin for urging the firing pin into said firing engagement with the detonator as the firing pin is released, and means fired by said detonator for firing said explosive charge.

9. In an explosive underwater signal device of the character disclosed, in combination, means including a firing pin for firing said explosive, a casing within which the firing pin is slideably arranged, a preformed diaphragm sealed to said casing and in communication with the surrounding water, said diaphragm being normally in spaced relation with respect to said firing pin and constructed and arranged to be deformed sufficiently to engage and apply pressure to the firing pin in response to a predetermined pressure applied thereto from the surrounding water corresponding to a predetermined depth of submergence of the device, a shear pin for preventing movement of the firing pin upon engagement thereof with said diaphragm, said shear pin being constructed and arranged to be sheared suddenly and release the firing pin in response to an additional increment of pressure applied thereto resulting from deformation of said diaphragm corresponding to a predetermined degree of movement of the device downwardly within the water beyond said predetermined depth thereby to fire the explosive at the completion of said movement.

10. In an explosive underwater signaling device of the class disclosed, in combination, a casing constructed and arranged to admit hydrostatic pressure therein as the device is launched and sinks within the water, means including a hydrostatically actuated device constructed and arranged to arm the signaling device as the device sinks to a predetermined depth within the water, a normally locked firing pin releasably supported in said casing for firing the explosive when the device is armed and the pin is released, a preformed diaphragm sealed to said casing and normally spaced from said pin and constructed and arranged to be deformed sufficiently to engage and apply pressure to the pin when said hydrostatic pressure within the casing has reached a predetermined value, means including a shear element for releasably locking the pin to the casing and adapted to cause release of the pin in response to the pressure applied thereto by the deformed diaphragm thereby to fire the explosive.

11. In a signaling device of the class disclosed adapted to be launched in a body of water, a casing constructed and arranged to admit hydrostatic pressure therein, an explosive charge disposed within said casing, an arming member slideably arranged within the casing and constructed and arranged to be moved from a safe position to an armed position, means responsive to hydrostatic pressure for moving the arming member to said armed position when the signaling device sinks to a predetermined depth of submergence, a detonator disposed within the arming member, a normally locked firing pin releasably supported within the casing and adapted to be driven into firing engagement with said detonator when the firing pin is released, a metallic diaphragm secured within the casing in sealed relation therewith and having a preformed annular channel disposed therein, reinforcing means secured to said diaphragm throughout the portion defined by said channel and in predetermined spaced relation from said firing pin for striking the firing pin a blow sufficient to cause the pin to be released and driven into firing engagement with said detonator as the metallic diaphragm is deformed in responsed to the pressure with the casing, and means fired by the detonator for firing said explosive charge.

12. In a signaling device of the class disclosed adapted to be launched in a body of water, a casing constructed and arranged to admit hydrostatic pressure therein, an explosive charge disposed within said casing, an arming member slideably arranged within the casing and constructed and arranged to be moved from a safe position to an armed position when the signaling device sinks to a predetermined depth of submergence, a detonator disposed within said arming member, a metallic diaphragm secured to said casing in sealed relation therewith for moving said arming member to said armed position in response to said hydrostatic pressure applied thereto, a normally locked firing pin releasably supported within the casing and constructed and arranged to be driven into firing engagement with said detonator when the firing pin is released, an initially rigid preformed diaphragm arranged within the casing in spaced relation with respect to said pin and constructed and arranged to be deformed sufficiently by the pressure within the casing to strike the pin and cause the pin to be released and driven into firing engagement with said detonator, and means fired by the detonator for firing said explosive charge.

13. A signaling device of the class described adapted to be launched in a body of water and comprising a casing, an explosive charge disposed within the casing, an arming member slideably disposed within the casing and constructed and arranged to be moved to an armed position, a detonator arranged within the arming member and movable therewith, a pressure responsive diaphragm arranged within the casing for moving said arming member to said armed position when the signaling device has reached a predetermined depth of submergence, a preformed pressure responsive diaphragm disposed within the casing and constructed and arranged to be suddenly deformed when the pressure within the casing has reached a predetermined value, a firing pin initially spaced from said preformed diaphragm and movable into firing engagement with said detonator when the arming member has moved the detonator into alignment with the firing pin and said diaphragm is deformed sufficiently to engage said pin, and preselector means responsive to the pressure of the surrounding water for rendering said preformed diaphragm effective at the depth of submergence corresponding to said predetermined pressure.

14. A signaling device of the character disclosed adapted to be launched in a body of water and comprising a casing, a detonator disposed within said casing, a plurality of inlet ports arranged around the casing, a plurality of rupturable discs respectively secured within said ports adapted to be ruptured to admit hydrostatic pressure into the casing in response to different values of hydrostatic pressure respectively corresponding to different depths of submergence, means supported on the casing for selecting for operation one of said discs, a preformed pressure responsive diaphragm disposed within the casing and constructed and arranged to be deformed suddenly when the hydrostatic pressure is admitted into the casing as said selected one of the discs is ruptured, and a normally locked firing pin releasably supported within the casing initially in spaced relation with respect to said diaphragm and movable thereby sufficiently to release and drive the pin into firing engagement with said detonator after the diaphragm is deformed sufficiently to engage the pin.

15. A signaling device of the class disclosed adapted to be launched in a body of water and comprising a casing, detonating means slideably arranged within said casing for movement to an armed position, a preformed metallic diaphragm responsive to hydrostatic pressure for moving said detonating means to said armed position when the device sinks to a predetermined depth of submergence, depth selective means including a plurality of ports arranged within the casing for selectively admitting a predetermined hydrostatic pressure therein, a normally locked firing pin releasably supported within the casing and constructed and arranged to be moved into firing engagement with the detonating means when the detonating means is in said armed position and the pin is released, and an initially rigid preformed pressure responsive diaphragm arranged within the casing in spaced relation with respect to said firing pin and constructed and arranged to be suddenly deformed into engagement therewith by said pressure within the casing for releasing and driving the firing pin into firing engagement with said detonating means.

16. A signaling device of the class disclosed adapted to be launched in a body of water and comprising a casing, an explosive charge disposed within said casing, an arming member having a detonator therein for firing said charge and slideably arranged within the casing and constructed and arranged to be moved from a safe position to an armed position, a preformed diaphragm responsive to hydrostatic pressure for moving the arming member from said safe position to said armed position when the device sinks to a predetermined depth of submergence, a normally locked firing pin releasably supported within the casing and adapted to be moved into firing engagement with said detonator when the arming member is in said armed position and said pin is released, depth selective means including a plurality of ports for selectively admitting a predetermined hydrostatic pressure into the casing as the device sinks within the water, and an initially rigid pressure responsive diaphragm arranged in spaced relation with respect to said firing pin for releasing and driving the firing pin into firing engagement with said detonator after the diaphragm is suddenly deformed to engage the pin by said pressure within the casing thereby to fire said explosive charge.

CHARLES F. BOWERSETT.
KENNETH L. BAKER.
CARL A. AXELSON.

REFERENCES CITED

The following references are of record in the file of this patent:

UNITED STATES PATENTS

| Number | Name | Date |
|---|---|---|
| 451,598 | Malmstrom | May 5, 1891 |
| 1,314,662 | Huber | Sept. 2, 1919 |
| 1,314,663 | Huber | Sept. 2, 1919 |
| 1,368,569 | Minkler | Feb. 15, 1921 |
| 1,418,606 | Swan | June 6, 1922 |
| 1,617,674 | Dieter | Feb. 15, 1927 |
| 2,462,305 | Catlin | Feb. 22, 1949 |